Oct. 6, 1959

M. A. SANT ANGELO 2,907,939

PHASE COMPARISON SERVOMECHANISM AND
RATE-TAKING APPARATUS THEREFOR

Filed June 23, 1955

INVENTOR
MICHAEL A. SANT ANGELO
BY
R. J. Craddock
ATTORNEY

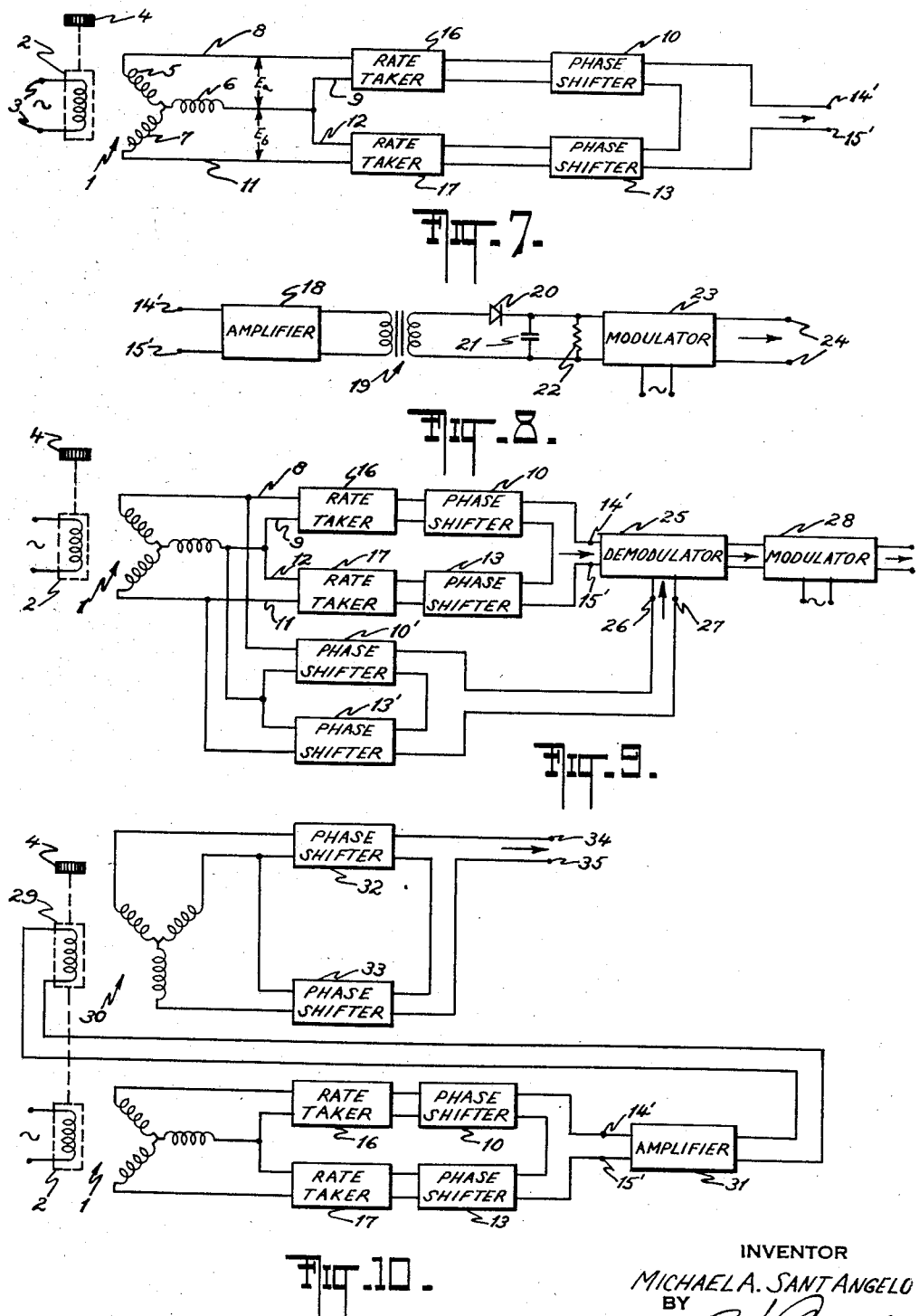

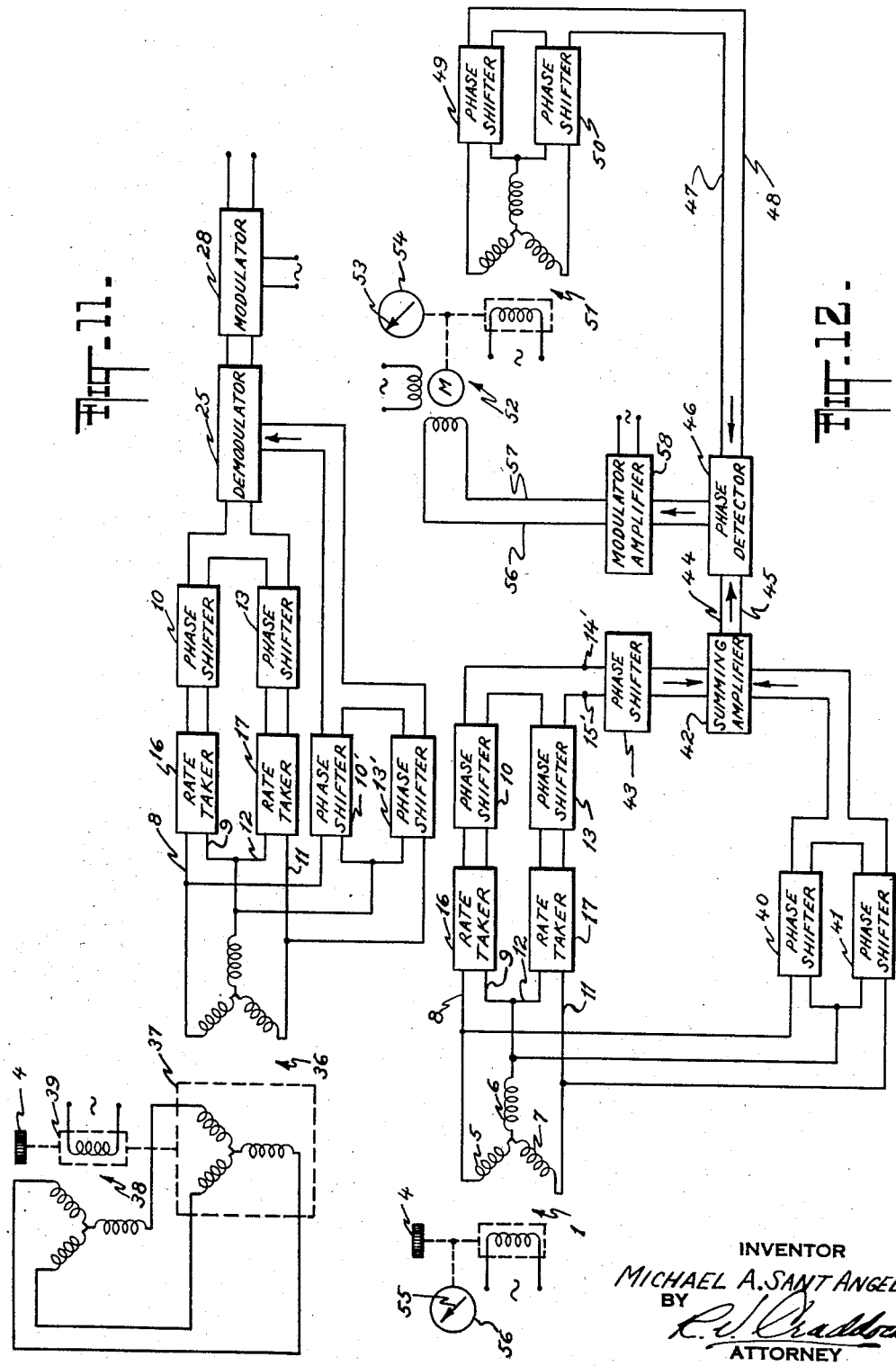

United States Patent Office 2,907,939
Patented Oct. 6, 1959

2,907,939

PHASE COMPARISON SERVOMECHANISM AND RATE-TAKING APPARATUS THEREFOR

Michael A. Sant Angelo, Levittown, N.Y., assignor to Sperry Rand Corporation, a corporation of Delaware Application June 23, 1955, Serial No. 517,444

12 Claims. (Cl. 318—30)

This invention relates to improvements in data transmission and control systems. More particularly, one aspect of the invention concerns a novel follow-up servomechanism apparatus of the phase-comparison type employing positional displacement and rate of change of positional displacement control signals. In other of its aspects, the invention relates to a novel arrangement and modifications thereof for producing electrical signals proportional to the rate of angular rotation of a rotatable member.

In follow-up servomechanisms, it is frequently desired to obtain an electrical signal proportional to the rate of change of the positional displacement of a control member. A tachometer generator device, for example, is sometimes connected to be driven by the control member to provide the requisite rate signal. However, if the normal movements of the control member are slow relative to the driving movement required by the tachometer to produce the desired signal, it becomes necessary to provide step-up gearing in the drive connection. Yet such gearing is intolerable where the control member is the sensitive element of a gyroscope or is the output shaft of some other device, the mechanical loading of which is inherently detrimental to performance.

To circumvent the detrimental mechanical loading effect of tachometer arrangements, follow-up servomechanisms have been provided where the tachometer is driven by the servomotor connected to position the controlled object, thereby to provide a rate feedback signal. This, however, is frequently a compromise measure that would be abondoned if a good rate signal were obtainable directly from the control member.

An approximate rate signal is sometimes obtained directly from the control member in an amplitude-comparison type of servomechanism. This may be accomplished by connecting the control member so as to position the single-winding energized rotor of a selsyn-like variable transformer device having a three-winding stator which is connected to the three-winding stator of a similar transformer device, and connecting the single-winding rotor of the latter transformer to a rate-taker. The rate signal thus obtained is actually proportional to the rate times the sine of the angular displacement of the control member. Small values of angular displacement are practically equal to the sine thereof, so that a good approximation of the rate signal is obtained as long as the angular displacement is confined to narrow limits about a given null point. This, however, imposes a restriction that may not be tolerated in many applications.

By the present invention, a rate-taking apparatus is provided that is without the disadvantages set forth for the foregoing arrangements. To this end, the multi-winding stator portion of a selsyn-like variable transformer, the rotor of which is directly connected for rotation to a rotatable control member, is coupled in circuit with a plurality of rate-takers. The output signals of the rate-takers are then given a predetermined phase difference, whereupon they are vectorially added. The amplitude of the resultant voltage is directly proportional to the angular rate of rotation of the control member over an unlimited range of rotation, and is continuously variable in phase according to the angular position of the control member.

The phase variation of the rate signal with control member position is readily eliminated if desired, as would be the case, for example, where the signal is to be used in an amplitude-comparison type of servomechanism. A number of schemes for accomplishing this are hereinafter described. An arrangement for increasing the sensitivity of the rate-taking apparatus of the present invention is also described.

According to the present invention in its servomechanism aspect, the variable phase-variable amplitude rate signal provided by the novel rate-taking apparatus is placed in control of a remote object driving servomotor together with a control member displacement signal and an object displacement feedback signal, both of which are constant in amplitude and continuously variable in phase according to the position of the control member and driven object, respectively.

A principal object of the present invention, therefore, is to provide an improved servomechanism apparatus of the phase comparison type employing a novel rate-taking arrangement for supplying a control term proportional to the rate of change of the angular displacement of a control member.

Another object is the provision of an improved rate-taking arrangement for supplying a signal voltage proportional solely to the rate of change of angular rotation of a rotatable shaft over an unlimited range of shaft rotation and continuously variable in phase according to the angular position of the shaft.

With the foregoing and other objects in view, the present invention includes the novel elements and the combinations and arrangements thereof described below and illustrated in the accompanying drawings, in which—

Fig. 7 is a schematic diagram of a preferred form of the rate-taking apparatus of the present invention;

Figs. 8–10 are schematic diagrams illustrative of arrangements for eliminating the continuous phase variation with rotor position of the output voltage provided by the apparatus of Fig. 7;

Fig. 11 is a schematic diagram showing a preferred arrangement for increasing the sensitivity of the apparatus of Fig. 7; and Fig. 12 is a schematic diagram of a preferred form of the phase-comparison type of servomechanism of the present invention.

Figure 1:
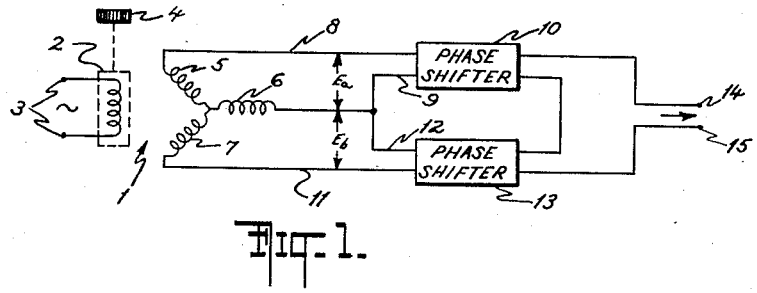
Fig. 1 is a schematic diagram of a variable transformer device adapted to function as a phase-shifter.

Fig. 1 schematically illustrates a conventional selsyn 1 adapted to produce an output E.M.F. of constant amplitude and of continuously variable phase which varies directly according to rotational movement of the selsyn's rotor. Thus, selsyn 1 includes a rotor 2 excited from a single phase alternating current source across terminals 3 and mechanically rotated by means of knob 4. Selsyn 1 further includes a stator portion consisting of three windings, 5, 6 and 7 that are Y-connected and physically spaced 120° apart. The voltage $E_a$ induced across the mutually unconnected ends of windings 5, 6 is fed via a pair of leads 8, 9 to a phase-shift device 10 while the voltage $E_b$ induced across the mutually unconnected ends of windings 6, 7 is fed via a pair of leads 11, 12 to a phase-shift device 13. The respective outputs of devices 10, 13 are combined so that their vector sum appears across a pair of output terminals 14, 15. As depicted in Fig. 1, the outputs to be summed are serially combined; however, it will be apparent that a parallel combining arrangement may be employed with like effect. By proper selection of devices 10 and 13, this vector sum will remain constant in magnitude as rotor 2 is turned through 360°, but the phase thereof will vary 1° for every degree the rotor is turned, as will now be shown by reference to Figs. 2–6.

Figure 2:
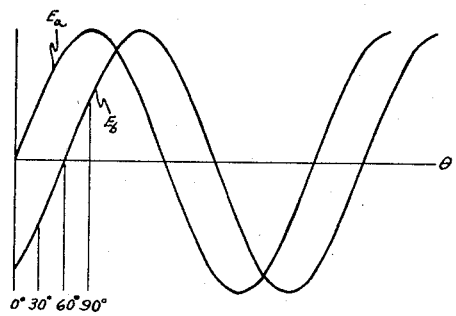
Fig. 2 is a plot of stator component voltages vs. rotor angular position for Fig. 1.

The curves depicted in Fig. 2 represent the magnitude variations or envelopes of $E_a$ and $E_b$, respectively, with respect to the angular position of rotor 2. In Fig. 2, $E_a$ is the voltage that would be measured from leads 9, 12 to lead 8, while $E_b$ is the voltage that would be measured from leads 9, 12 to lead 11. Electrically, the voltages are in time phase or in time phase opposition, although they vary in relative magnitudes as the rotor is turned. If phase shift device 10 is constructed to phase shift $E_a$ so that the output $E_a'$ of device 10 leads $E_a$ by 30° and if phase shift device 13 is constructed to phase shift $E_b$ so that the output $E_b'$ of device 13 lags $E_b$ by 30° then $E_a'$ and $E_b'$ will differ in phase by 60° when $E_a$ and $E_b$ are cophasal, and by 240° when $E_a$ and $E_b$ are phase opposed. The vector sum of $E_a'$ and $E_b'$ for different rotor positions will always be equal in magnitude to a given proportion of the common maximum magnitude of $E_a$ and $E_b$, the proportion depending on the common attenuation of devices 10, 13. However, the phase of the sum will vary one degree for degree according to the position of rotor 2.

Figure 3:
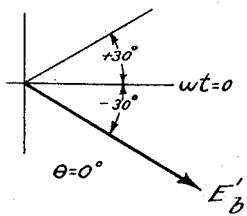
Figs. 3–6 are vector diagrams illustrative of the characteristics of the Fig. 1 device.
Figure 4:
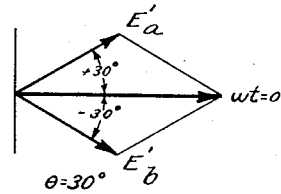
Figure 6:
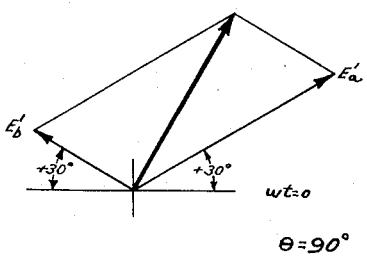
Figure 5:
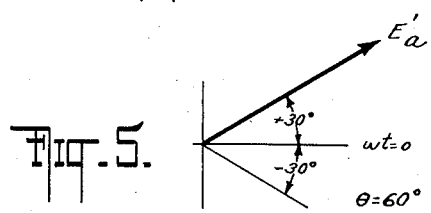

Thus, Fig. 3 vectorially represents the voltage across terminals 14, 15 (Fig. 1) for a rotor displacement $\theta=0°$ (Fig. 2), where $E_a'=0$ and $E_b'=86.6\%$ of the common maximum value of $E_a'$ and $E_b'$. Similarly, Fig. 4 represents the voltage across terminals 14, 15 for a rotor displacement $\theta=30°$, where $E_a'$ and $E_b'$ each equal 50% of the common maximum value of $E_a'$ and $E_b'$, giving a vector sum equal to 86.6% of the maximum. In Fig. 5, the rotor displacement $\theta=60°$; and in Fig. 6, $\theta=90°$. At $\theta=90°$, the phase of $E_b$ is reversed so that $E_b'$ then lags $E_b$ by $(180°+30°)$ or 210°. It will be noted that in each instance, the vector sum of $E_a'$ and $E_b'$ is identical in magnitude, but changes one degree in phase for every degree that rotor 2 (Fig. 1) is turned.

While phase-shifters 10, 13 have been described as providing equal and opposite phase shifts of 30°, the same result may be obtained by eliminating one of the phase-shifters and substituting a 60 phase-shifter for the other, so long as the attenuation produced in leads 8, 9 remains the same as the attenuation produced in leads 11, 12. By the same token, providing that equal attenuation is maintained, phase-shifters 10, 13 may produce different phase shifts, so long as the aggregate phase shift produced is 60°.

A system of the general nature thus far described is the subject of U.S. Patent 2,627,598 issued February 3, 1953, in the names of Jay E. Browder and Victor J. Young.

Referring now to Fig. 7, it will be seen how the arrangement of Fig. 1 is modified to provide the rate-taking apparatus of the present invention. Instead of the stator winding leads 8, 9 being connected to the input terminals of phase shift device 10 as in Fig. 1, they are connected to the input terminals of an A.C. rate-taker 16 which may, for example, be a demodulator-D.C. rate network-modulator type, a chopper type of rate circuit, or a parallel-T network type of A.C. rate-taker as described in U.S. Patent 2,446,567 issued August 10, 1948, in the names of Gifford E. White and Morris Relson. Similarly, stator winding leads 11, 12 are connected to the input terminals of an A.C. rate-taker 17 substantially identical to rate-taker 16.

The respective outputs of rate-takers 16, 17 (Fig. 7) are such that their envelopes lead in time phase that of their respective input envelopes by approximately 90°. In other words, each rate envelope reaches its maximum value the same number of degrees of rotor rotation apart as do the input envelopes, but the maximum for each rate envelope occurs approximately 90° of rotor rotation in advance of the occurrence of the corresponding maximum of the input envelopes. The rate envelope maximums are equal, and vary in proportion to the rotor's rate of rotation. The respective phases of the carrier waves in the rate envelopes remain the same as the phases of the corresponding carrier waves in the input envelopes.

The cophasal or phase-opposed rate outputs of rate-takers 16, 17 (Fig. 7) are fed, respectively, to phase shift devices 10, 13. As in Fig. 1, device 10 provides an output the phase of which leads its input by 30°, while device 13 provides an output the phase of which lags its input by 30°. Thus, the outputs of devices 10, 13 have a phase difference of 60° for cophasal outputs of rate-takers 16, 17 and a phase difference of 240° for phase-opposed outputs of the rate-takers.

By serially connecting the outputs of devices 10, 13 across terminals 14', 15' as shown in Fig. 7, or by suitable parallel connections if desired, the voltage across the terminals is the vector sum of the outputs. For a given rate of rotation of rotor 2 (Fig. 1), the vector sum is constant at a given proportion of the common maximum magnitude of the outputs of rate-takers 16 and 17, regardless of the angular position of the rotor with respect to the stator windings. If the rotor's rate of rotation is increased, the magnitude of the vector sum across terminals 14', 15' is increased a proportionate amount, remaining constant throughout 360° of rotor movement so long as the rotational rate remains constant. Likewise, if the rate is decreased, the vector sum is decreased a proportionate amount, again remaining constant throughout 360° so long as the rate remains constant.

By the arrangement of Fig. 7, therefore, an A.C. voltage is obtained across terminals 14', 15' having a magnitude proportional to the rate of angular movement imparted to rotor 2 (Fig. 1). However, while the magnitude of this A.C. voltage remains constant for a given rotor rate, its phase varies degree for degree with variations in rotor position, as did the phase of the output of the arrangement of Fig. 1.

In order to increase the flexibility of the basic rate-taking arrangement of Fig. 7, the phase shift of the rate signal that occurs with changes in rotor position may be eliminated in a fashion now to be described in connection with Fig. 8.

In Fig. 8, the rate signal across terminals 14', 15' (Fig. 7) is amplified in an amplifier 18 and fed via an isolation transformer 19 to a half-wave demodulator circuit comprising a rectifier 20, a by-pass condenser 21 and output resistor 22. The impedance of amplifier 18 is sufficiently large to avoid detrimentally affecting the required phase difference between the outputs of phase shift devices 10, 13 (Fig. 7). The amplified and rectified rate signal across resistor 22 is fed to a modulator 23 supplied with alternating current of given phase whereby the D.C. rate signal is converted to an A.C. rate signal appearing across modulator output terminals 24. The circuit of Fig. 8 thus provides an A.C. signal whose magnitude is proportional to the rate, but is of a constant non-reversible phase, hence does not indicate the sense (clockwise or counterclockwise) of the rate at which rotor 2 (Fig. 1) rotates.

The demodulator-modulator arrangement of Fig. 8, however, may be modified in a maner to provide an A.C. signal which is proportional to the rate and is of reversible phase (0° or 180°) depending on the sense of the rate. Such a modification is depicted in Fig. 9 wherein a phase-sensitive demodulator is connected to receive the variable phase rate signal across terminals 14', 15' (Fig. 7) as one input and a second variable phase signal as the reference input, the latter signal having a phase variation with rotor displacement the same as the rate signal. The reference input to demodulator 25 is obtained by feeding the stator winding voltages that appear across leads 8, 9 and 11, 12 to a phase shift device 10' and a phase shift device 13', respectively. Devices 10', 13' are identical to devices 10, 13, so that their combined output across demodulator reference terminals 26, 27 is of constant magnitude and variable in phase according to rotor position, in the manner described in connection with Fig. 1. Thus, the output of demodulator 25 is a plus or minus D.C. rate signal, depending on the sense of the rate. By modulating this reversible polarity rate signal in a modulator 28, the signal is converted into an A.C. signal proportional to the rate and of reversible phase depending on the sense of the rate.

Another arrangement for eliminating the phase variation (with rotor position) of the rate signal obtained from Fig. 7 is shown in Fig. 10 wherein a second selsyn and phase network are employed to phase shift the rate signal in an equal but opposite direction. Thus, knob 4 (Fig. 7) is mechanically connected to rotate rotor 2 of selsyn 1 in unison with the rotor 29 of an identical selsyn 30. Rotor 29 is energized by the variable phase rate signal across terminals 14', 15' (Fig. 7) amplified by an isolation amplifier 31. The stator of selsyn 30 is connected through a pair of phase shift devices 32, 33 identical to devices 10, 13 to a pair of output terminals 34, 35 in the manner of Fig. 1. Hence, if rotor 29 were energized by a signal of constant phase and magnitude, the signal appearing across terminals 34, 35 would be of constant magnitude but variable in phase according to the position of rotor 29. However, by the arrangement of Fig. 10, rotor 29 is actually energized by a signal (output of amplifier 31) whose phase varies exactly as the phase variation of the rate signal across terminals 14', 15' and whose magnitude varies in proportion to the rate at which knob 4 is turned. The angular position of rotor 29 relative to the stator of selsyn 30 is initially adjusted with respect to the angular position of rotor 2 relative to the stator of selsyn 1 so that the phase variation of the rate signal fed to rotor 29 is counteracted by an equal and opposite phase variation in the stator circuit of selsyn 30. The resultant signal across terminals 34 and 35, therefore, is of reversible phase dependent on the sense of the rate and has a magnitude directly proportional to the rate.

The arrangements of Figs. 8–10 for eliminating the phase variation with rotor position of the rate signal output of Fig. 7 render the system more flexible in that they supply a rate signal usable in amplitude-comparison type servomechanism apparatus. If higher sensitivity is desired, i.e., a better rate signal at a low rotational rate of rotor 2, the arrangement of Fig. 7 may be further modified as, for example, shown in Fig. 11.

Fig. 11 comprises the arrangement of Fig. 9 (phase-sensitive demodulator and modulator elimination of rate signal phase variation), except that selsyn 1 is replaced by a differential selsyn 36 whose stator feeds the rate-takers 16, 17 and whose rotor 37 is connected in back-to-back relation with the stator of a second selsyn 38 having a single-winding rotor 39 excited from a single-phase source of constant magnitude and frequency. Knob 4 is connected to rotate rotors 37, 39 in unison and in such directions relative to their respective stators that the electrical vector presented to the rate circuit via the stator of selsyn 36 rotates twice the number of degrees that the knob is rotated. Hence, if the rate taking arrangement of Fig. 9 can take good rates down to one revolution per minute of knob 4, the arrangement of Fig. 11 provides equally good rates down to one-half revolution per minute, whereby response is improved by a factor of two.

Fig. 12 depicts a servomechanism system of the phase comparison type wherein a controlled object is positioned in accordance with the positional displacement and rate of change of positional displacement of a remote controller device. In Fig. 12, use is made of the rate-taking arrangement of Fig. 7 for providing a signal the magnitude of which is proportional to the controller's rate of displacement. Accordingly, knob 4, serving as the controller, causes a variable phase rate signal to appear at terminals 14', 15' while the knob is turned. Besides being connected to rate-takers 16 and 17, the stator of selsyn 1 is also connected to a pair of phase shift devices 40 and 41 identical to devices 10 and 13, the connection being made in the manner described in Fig. 1. The respective outputs of devices 40, 41 are serially combined to form a net signal the magnitude of which remains constant as knob 4 is turned, but whose phase varies relative to the excitation phase of selsyn 1 degree-for-degree with the angular displacement of the knob. This variable phase displacement signal is fed as one input to a high impedance summing amplifier 42 which receives as its other input, via a 90° phase shift device 43, the variable phase displacement rate signal from the rate circuit output terminals 14', 15'. Device 43 operates on the carrier wave within the envelope of the rate signal appearing at terminals 14', 15 so as to supply amplifier 42 with a rate signal having a different carrier phase relative to the carrier phase of the displacement signal. It is immaterial whether the plate shift produced by device 43 is in a leading or lagging sense, the principal criterion being that amplifier 42 sums the displacement and rate carriers out of electrical phase, preferably 90° for purposes of symmetry. Otherwise, while the magnitude of the rate signal would vary in proportion to the rate, the phase of the signal would vary in step with the phase variation of the displacement signal.

The displacement-displacement rate output of summing amplifier 42 (Fig. 12) is fed via a pair of leads 44, 45 to one set of input terminals of a phase detector 46. The other set of input terminals of detector 46 are connected via a pair of leads 47, 48 to receive the serially combined outputs of a pair of phase shift devices 49, 50 in the stator circuit of a selsyn 51 provided for follow-up purposes. The rotor of selsyn 51 is excited from the same source as the rotor of selsyn 1, and is mechanically connected to be rotatably driven by a reversible two-phase induction motor 52. Devices 49, 50 are identical to devices 40, 41 and 10, 13. They are arranged in the stator circuit in the manner of Fig. 1 to provide on leads 47, 48 a signal of constant magnitude and of a phase that varies degree-for-degree with the angular displacement of the rotor of selsyn 51.

Besides being connected to drive the rotor of selsyn 51, motor 52 is mechanically connected to position a pointer 53 relative to a dial 54, pointer 53 serving for illustrative purposes as the controlled object that is driven in accordance with the angular displacement and displacement rate of remotely-located knob 4. The angular displacement of knob 4 is indicated by a pointer 55 mechanically connected to the knob and cooperating with a dial 56 like dial 54.

Detector 46 compares the control signal on leads 44, 45 with the follow up signal on leads 47, 48 and supplies an error signal the magnitude of which is proportional to the difference in relative positions of pointers 53, 55 and the polarity of which reverses depending on the direction that pointer 53 must be driven to come into positional agreement with pointer 55. The error signal output of detector 46 is modulated and amplified in a modulator-amplifier 58 to provide an A.C. signal proportional to the sum of the positional disagreement of pointers 53, 55 and the rate of change of position of pointer 55. This signal is fed via a pair of modulator output leads 56, 57 to the control winding of motor 52, the reference winding thereof being excited from an A.C. source of constant frequency and magnitude. Thus, motor 52 is energized to drive the rotor of selsyn 51 to reduce the error signal output of detector 46 to zero, thereby to place pointer 53 in positional agreement with pointer 55.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A follow-up servomechanism apparatus of the phase comparison type comprising a rotatable control member, means for providing a first constant magnitude signal of fixed frequency and of phase continuously variable according to rotational movement of said control member, means for providing a second signal having said fixed frequency, said second signal being of variable magnitude proportional to the rate of said rotational movement and of continuously variable phase according to rotational movement of said control member, the phase of said second signal reversing upon reversal of the direction of said rotational movement, means for shifting the phase of said second signal relative to the phase of said first signal by 90°, means connected to said phase shifting means and said first signal providing means for adding the respective signal outputs thereof, a rotatable driven member, means for providing a third constant magnitude signal of said fixed frequency and of phase continuously variable according to rotational movement of said driven member, phase detector means connected to said adding means and said third signal providing means for providing an error signal according to the phase difference between their signal outputs, electromotive means mechanically connected to rotate said driven member, and means coupling said detector means to said electromotive means for energizing the latter in accordance with said error signal, whereby said driven member is rotated until said third signal is adjusted sufficiently in phase to reduce said error signal to zero.

2. A rate-taking apparatus capable of producing an output signal proportional to the rate of angular rotation of a control member, said apparatus comprising an inductive selsyn-like transformer having rotor and stator cores of magnetic material, a single phase winding on said rotor core and a polyphase winding comprising windings mounted on said stator core in 120° physical relation to each other, said windings being wound to provide substantially equal induced voltages in each stator winding when maximum coupling occurs between it and said rotor winding, a control member for angularly adjusting the rotor relative to the stator, first A.C. rate-taking means in circuit with a first pair of said stator windings for providing a first A.C. signal of a magnitude proportional to the rate of change of the magnitude of the voltage across said first pair of stator windings and of reversing phase dependent on the sense of said magnitude change, second A.C. rate-taking means in circuit with a second pair of said stator windings including one of said first winding pair for providing a second A.C. signal of a magnitude proportional to the rate of change of the magnitude of the voltage across said second pair of stator windings and of reversing phase dependent on the sense of said magnitude change, phase shifting means coupled to said first and second rate-taking means for providing a phase difference between said first and second rate signals of 60°, and means for vectorially combining said phase displaced rate signals to supply a resultant signal, the resultant signal being of a magnitude proportional to the rate of angular rotation of the control member and remaining constant for a given rate notwithstanding the amount of said rotation and being of a phase variable in accordance with said rotation.

3. A system for producing a voltage of a phase that is variable according to the angular position of a rotary shaft and of a magnitude that is variable according to the rate of angular rotation of said shaft, said system comprising an inductive device having a plurality of secondary windings, said inductive device including a primary winding mechanically connected to said shaft and inductively coupled to said secondary winding to produce across each secondary winding a voltage which is a cosine function of the coupling angle between said primary and secondary winding, a source of single phase excitation current for said primary winding, first A.C. rate taking means connected across a first pair of secondary winding terminals for providing a first A.C. signal voltage of a magnitude proportional to the rate of change of the voltage magnitude across said first terminal pair, second A.C. rate taking means connected across a second pair of secondary winding terminals including one of said first terminal pair for providing a second A.C. signal voltage of a magnitude proportional to the rate of change of the voltage magnitude across said second terminal pair, phase shifting means coupled to said first and second rate taking means for providing a predetermined phase difference between said rate signal voltages, and means for vectorially combining said rate signal voltages of different phase to supply a resultant signal voltage, the phase difference produced by said phase shifting means being such that said resultant signal voltage has a given magnitude for a given angular rate of shaft rotation and a phase that varies in accordance with the amount of said rotation.

4. A system for producing a voltage of a phase that is variable according to the angular position of a rotary shaft and of a magnitude that is variable according to the rate of angular rotation of said shaft, said system comprising an inductive device having three Y-connected secondary windings, said inductive device including a primary winding mechanically connected to said shaft and arranged to be inductively coupled to said secondary windings to produce across each secondary winding a voltage which is a cosine function of the coupling angle between said primary and secondary windings, a source of single-phase excitation current for said primary winding, first A.C. rate-taking means in circuit with a first pair of said secondary windings for providing a first A.C. signal voltage of a magnitude proportional to the rate of change of the voltage magnitude across said first winding pair, second A.C. rate-taking means in circuit with a second pair of said secondary windings including one of said first winding pair for providing a second A.C. signal voltage of a magnitude proportional to the rate of change of the voltage magnitude across said second winding pair, phase shifting means coupled to said first and second rate-taking means for providing a predetermined phase difference between said rate signal voltages, and means for vectorially combining said rate signal voltages of different phase to supply a resultant signal voltage, the phase difference produced by said phase-shifting means being such that said resultant signal voltage has a given magnitude for a given angular rate of shaft rotation and a phase that varies in accordance with the amount of said rotation.

5. An arrangement for measuring and transmitting the rate of angular rotation of a rotary shaft comprising in combination a self-synchronous transmitter having a multiple-winding stator portion and a single-winding rotor portion, a source of single-phase alternating current, said rotor winding being electrically connected to said source for excitation and mechanically connected to said rotary shaft for angular rotation, the multiple windings of said stator being angularly disposed and having a plurality of output leads so that relative movement between said stator and rotor portions produces relative variations of magnitude in the induced alternating voltages across respective pairs of said stator leads, first A.C. rate-taking means in circuit with a first pair of said stator leads for providing a first A.C. signal of a magnitude proportional to the rate of change of the magnitude of the voltage across said first lead pair, second A.C. rate-taking means in circuit with a second pair of said stator leads including one of said first lead pair for providing a second A.C. signal of a magnitude proportional to the rate of change of the magnitude of the voltage across said second lead pair, phase shifting means coupled to said first and second rate-taking means for providing a phase difference between said rate signals so that their vector sum is of a magnitude proportional to the rate of angular rotation of said rotary shaft notwithstanding the amount of said rotation and of a phase variable in accordance with said rotational amount.

6. An arrangement for measuring and transmitting the rate of angular rotation of a rotary shaft comprising in combination a self-synchronous transmitter having a multiple-winding stator portion and a single-winding rotor portion, a source of single-phase alternating current, said rotor winding being electrically connected to said source for excitation and mechanically connected to said rotary shaft for angular rotation, the multiple windings of said stator being angularly disposed and having a plurality of output leads so that relative movement between said stator and rotor portions produces relative variations of magnitude in the induced alternating voltages across respective pairs of said stator leads, first A.C. rate-taking means in circuit with a first pair of said stator leads for providing a first A.C. signal of a magnitude proportional to the rate of change of the magnitude of the voltage across said first lead pair, second A.C. rate-taking means in circuit with a second pair of said stator leads including one of said first lead pair for providing a second A.C. signal of a magnitude proportional to the rate of change of the magnitude of the voltage across said second lead pair, phase shifting means coupled to said first and second rate-taking means for providing a phase difference between said rate signals of 60°, and means for vectorially combining said phase-displaced rate signals to supply a resultant signal, said resultant signal being of a magnitude proportional to the rate of angular rotation of said rotary shaft and remaining constant for a given rate notwithstanding the amount of said rotation and being of a phase variable in accordance with said rotation.

7. Rate taking apparatus comprising a multiple output component energy transfer device having a single phase input voltage circuit and at least three output component terminals, said device comprising inductive means having a rotor portion including a winding coupled to said input voltage circuit and a stator portion having relatively angularly disposed windings coupled to said output component terminals and being so arranged that relative movement between said rotor and stator portions produces relative variations of the alternating voltage component amplitudes between first and second pairs of said output terminals, means connected to rotate said rotor portion relative to said stator portion, first rate taking means connected between said first terminal pair for producing an alternating voltage the amplitude of which is proportional to the rate of change of the amplitude of the voltage component across said first terminal pair, second rate taking means substantially identical to said first rate taking means and connected between said second terminal pair including one of said first terminal pair for producing an alternating voltage the amplitude of which is proportional to the rate of change of the amplitude of the voltage component across said second terminal pair, the voltage outputs of the respective rate-taking means being cophasal and simultaneously reversing in phase according to the direction in which said rotor portion is rotated, a first coupling network connected to said first rate taking means so as to receive the output thereof, a second coupling network connected to said second rate taking means so as to receive the output thereof, said networks being substantially identical attenuation-wise and being so arranged as to produce a predetermined phase difference between their output voltage versions when their input voltages are cophasal, and means for adding the outputs of said networks to produce a resultant voltage of phase variable degree for degree with changes in the relative positions of said portions of said inductive device and of a magnitude dependent upon the angular rate of relative angular movement of said portions.

8. The apparatus of claim 7 further including means connected to the network output adding means for modifying the resultant voltage in a manner to eliminate the continuous phase variation thereof.

9. The apparatus of claim 8 wherein the resultant voltage modifying means includes means for rectifying the resultant voltage, a source of alternating current of constant phase, and modulating means coupled to said rectifying means and said source for providing an alternating voltage proportional to said resultant voltage and of said constant phase.

10. The apparatus of claim 8 wherein the resultant voltage modifying means includes means connected in circuit with the stator portion for supplying a voltage of constant amplitude and continuously variable phase according to changes in the relative positions of the stator and rotor portions, and phase-sensitive demodulator means connected to said last-mentioned means and the network output adding means for providing a D.C. output voltage of magnitude dependent on the resultant voltage produced by said adding means and of reversible polarity dependent on the direction of said relative positional changes of said stator and rotor positions.

11. The apparatus of claim 8 wherein the resultant voltage modifying means includes a second multiple output component energy transfer device substantially identical to the transfer device set forth in claim 8 except that the rotor winding thereof is coupled to the network output adding means for energization by the resultant voltage produced by said adding means, the rotor portions of the two energy transfer devices being mechanically connected for equal and simultaneous rotation relative to their respective stator portions, and means connected in circuit with the stator portion of said second energy transfer device for supplying a voltage of amplitude dependent on the amplitude of said resultant voltage and of reversible phase dependent on the direction of the rotation of said rotor portions relative to said stator portions.

12. The apparatus of claim 8 further including variable transformer means operable to multiply the rotation of the electrical vector presented to the respective rate-taking means by a predetermined factor, and means mechanically connected to the rotor portion of said inductive means for operating said variable transformer means.

References Cited in the file of this patent

UNITED STATES PATENTS

| 2,446,567 | White et al. | Aug. 10, 1948 |
| 2,632,872 | Warsher | Mar. 24, 1953 |
| 2,703,380 | Fraser | Mar. 1, 1955 |
| 2,774,928 | Johnson et al. | Dec. 18, 1956 |

OTHER REFERENCES

Servomechanism Fundamentals, p. 29, Fig. 2, 8, Lauer, Lesnick, and Matson, McGraw-Hill, New York, 1947.

Ghiradi, A.H.: Radio Physics Course, p. 569, Fig. 277, Radio and Technical Publishing Co., New York, 1933.